(12) United States Patent
Takahashi et al.

(10) Patent No.: US 10,669,464 B2
(45) Date of Patent: *Jun. 2, 2020

(54) HALOOLEFIN-BASED COMPOSITION

(71) Applicant: DAIKIN INDUSTRIES, LTD., Osaka (JP)

(72) Inventors: Kazuhiro Takahashi, Osaka (JP); Tatsumi Tsuchiya, Osaka (JP); Yasufu Yamada, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/055,881

(22) Filed: Feb. 29, 2016

(65) Prior Publication Data

US 2016/0230060 A1 Aug. 11, 2016

Related U.S. Application Data

(63) Continuation of application No. PCT/JP2015/072669, filed on Aug. 10, 2015.

(30) Foreign Application Priority Data

Sep. 26, 2014 (JP) .................................. 2014-196449

(51) Int. Cl.
| | |
|---|---|
| C09K 5/04 | (2006.01) |
| C10M 171/00 | (2006.01) |
| A62D 1/00 | (2006.01) |
| B01F 17/00 | (2006.01) |
| C09K 3/00 | (2006.01) |
| C09K 3/30 | (2006.01) |
| C11D 7/30 | (2006.01) |

(52) U.S. Cl.
CPC ............ C09K 5/045 (2013.01); A62D 1/0035 (2013.01); B01F 17/0035 (2013.01); C09K 3/00 (2013.01); C09K 3/30 (2013.01); C10M 171/008 (2013.01); C11D 7/30 (2013.01); C09K 2205/126 (2013.01); C09K 2205/22 (2013.01); C09K 2205/40 (2013.01); C10M 2209/1033 (2013.01); C10N 2220/302 (2013.01); C10N 2230/66 (2013.01)

(58) Field of Classification Search
CPC .................................................... A62D 1/0035
See application file for complete search history.

(56) References Cited

U.S. PATENT DOCUMENTS

| | | | |
|---|---|---|---|
| 2006/0043331 A1* | 3/2006 | Shankland | C09K 5/045 252/67 |
| 2010/0029997 A1 | 2/2010 | Wang et al. | |
| 2010/0122545 A1 | 5/2010 | Minor et al. | |
| 2010/0249469 A1 | 9/2010 | Takahashi | |
| 2011/0037016 A1 | 2/2011 | Singh et al. | |
| 2011/0144216 A1 | 6/2011 | Hulse et al. | |
| 2011/0160500 A1 | 6/2011 | Takahashi | |
| 2011/0172472 A1 | 7/2011 | Sakyu et al. | |
| 2011/0312101 A1 | 12/2011 | Tsuchiya et al. | |
| 2012/0065437 A1 | 3/2012 | Merkel et al. | |
| 2012/0068105 A1 | 3/2012 | Rached et al. | |
| 2012/0255316 A1 | 10/2012 | Andre et al. | |
| 2013/0012420 A1 | 1/2013 | Matsumoto | |
| 2013/0092869 A1 | 4/2013 | Boussand | |
| 2013/0099154 A1* | 4/2013 | Boussand | C09K 5/045 252/68 |
| 2013/0105724 A1 | 5/2013 | Boussand | |
| 2013/0158305 A1 | 6/2013 | Takahashi | |
| 2014/0070129 A1 | 3/2014 | Kennoy et al. | |
| 2014/0248706 A1 | 9/2014 | Tsuchiya et al. | |
| 2014/0305161 A1 | 10/2014 | Kawaguchi et al. | |
| 2014/0316169 A1 | 10/2014 | Wang et al. | |
| 2015/0038381 A1 | 2/2015 | Matsumoto et al. | |
| 2015/0041705 A1 | 2/2015 | Saito et al. | |
| 2015/0051426 A1 | 2/2015 | Fukushima et al. | |
| 2015/0252281 A1 | 9/2015 | Saito et al. | |
| 2016/0289148 A1 | 10/2016 | Fukushima et al. | |
| 2017/0137352 A1 | 5/2017 | Wang et al. | |
| 2017/0174591 A1 | 6/2017 | Wang et al. | |

FOREIGN PATENT DOCUMENTS

| | | |
|---|---|---|
| CN | 1878849 | 12/2006 |
| CN | 102191112 | 9/2011 |
| CN | 102713470 | 10/2012 |
| JP | 3-209338 | 9/1991 |

(Continued)

OTHER PUBLICATIONS

International Search Report dated Oct. 20, 2015 in corresponding International (PCT) Application No. PCT/JP2015/072669.

(Continued)

*Primary Examiner* — Peter F Godenschwager

(74) *Attorney, Agent, or Firm* — Wenderoth, Lind & Ponack, L.L.P.

(57) ABSTRACT

The present invention provides a highly stable haloolefin-based composition that inhibits decomposition or oxidization.

The haloolefin-based composition comprising (a) a haloolefin; (b) at least one compound selected from the group consisting of HFO-1234ze, HFC-254eb, HFO-1243zf, HFC-245eb, HFC-245fa, HFC-245cb, HFC-236ea, HFC-236fa, HFO-1225ye, 3,3,3-trifluoropropine, HFC-23, HFC-32, HFC-125, HFC-143a, HFC-134a, FC-1216, HCFO-1233xf, HCFO-1233zd, HCFO-1232xf, HCFO-1223xd, and chloromethane; and (c) water.

4 Claims, No Drawings

(56) References Cited

FOREIGN PATENT DOCUMENTS

| | | |
|---|---|---|
| JP | 2000-34238 | 2/2000 |
| JP | 2007-535611 | 12/2007 |
| JP | 2009-126803 | 6/2009 |
| JP | 2009-539598 | 11/2009 |
| JP | 2010-37343 | 2/2010 |
| JP | 2010-83818 | 4/2010 |
| JP | 4699758 | 6/2011 |
| JP | 2011-520016 | 7/2011 |
| JP | 2011-202032 | 10/2011 |
| JP | 2012-500182 | 1/2012 |
| JP | 2012-509392 | 4/2012 |
| JP | 2013-87187 | 5/2013 |
| JP | 2013-529717 | 7/2013 |
| JP | 2013-203953 | 10/2013 |
| JP | 2013-209592 | 10/2013 |
| JP | 2013-539475 | 10/2013 |
| JP | 2014-47267 | 3/2014 |
| WO | 2004/037913 | 5/2004 |
| WO | 2005/049760 | 6/2005 |
| WO | 2005/103187 | 11/2005 |
| WO | 2005/105947 | 11/2005 |
| WO | 2007/144632 | 12/2007 |
| WO | 2009/137656 | 11/2009 |
| WO | 2010/021406 | 2/2010 |
| WO | 2010/059685 | 5/2010 |
| WO | 2010/098447 | 9/2010 |
| WO | 2010/098451 | 9/2010 |
| WO | 2011/091404 | 7/2011 |
| WO | 2011/163117 | 12/2011 |
| WO | 2012/006206 | 1/2012 |
| WO | 2012/033088 | 3/2012 |
| WO | 2013/032768 | 3/2013 |
| WO | 2013/161724 | 10/2013 |
| WO | 2014/080868 | 5/2014 |

OTHER PUBLICATIONS

Extended European Search Report dated Nov. 7, 2016 in corresponding European Application No. 15190792.0.
CRC Handbook of Chemistry and Physics, 62nd Edition, CRC Press 1981, p. F-172.
AHRI Standard 700; "2012 Standard for Specifications for Fluorocarbon Refrigerants", Air-Conditioning, Heating, and Refrigeration Institute, 2012, 20 pgs.
ANSI/AHRI Standard 700 with Addenda 1 and 2, "2006 Standard for Specifications for Fluorocarbon Refrigerants", Air-conditioning, Heating, and Refrigeration Institute, 2011, 23 pgs.
AHRI Standard 700 "2011 Standard for Specifications for Fluorocarbon Refrigerants", Air-Conditioning, Heating, and Refrigeration Institute, 2011, pp. 1-16.
EPO Communication dated Mar. 2, 2018 providing Third party observation filed Feb. 23, 2018 against related European Patent Application No. 15760360.6.
AHRTI Report No. 09004-01, "Material Compatability & Lubricants Research for Low GWP Refrigerants—Phase I: Thermal and Chemical Stability of Low GWP Refrigerants With Lubricants", (2012), 72 pages.
Excerpt from the Rompp Chemistry Encyclopedia, 10th Edition (1969) for the keyword "polyalkelyne glycols" p. 3413.
Product Bulletin for the Ze-GLES RB, JXTG Nippon Oil & Energy Corporation, (2011), 2 pages (corresponds to CH).
Excerpt of the Sigma-Aldrich catalogue, (2008), pp. 2465 and 2572.
Extended European Search Report dated Apr. 18, 2017 in related European Patent Application No. 15760360.6.
Kagakukougaku Binran, "Chemical Engineering Handbook", Society of Chemical Engineers, (2006), pp. 80-83, with English translation.
Ze-Gles RB, A Polyol Ester-based Refrigerant Oil for HFC Refrigerants, searched by opponents Jan. 12, 2012, with English translation (corresponds to CD).
Extended European Search Report dated Feb. 26, 2016 in related European Patent Application No. 15190793.8.
Excerpt from "CRC Handbook of Chemistry and Physics", 76th Edition, 1995-1996, CRC Press, pp. 14-14 and 14-15.
EPO Communication dated Mar. 12, 2018 providing Third party observation filed Mar. 2, 2018 against related European Patent Application No. 15190793.8.
Excerpt from the Rompp Chemistry Encyclopedia, 10th Edition (1996) for the keyword "polyalkylene glycols", p. 3413.
Third party observation filed Nov. 30, 2018 against corresponding/related EP patent application No. 15190793.8.
OXY Chem, Sales Specification, 2011.
Communication pursuant to Rule 114(2) EPC dated Jun. 25, 2019 in corresponding European Patent Application No. 15760361.4.
Extended European Search Report dated Aug. 29, 2019 in corresponding European Patent Application No. 19170086.3.

* cited by examiner

HALOOLEFIN-BASED COMPOSITION

TECHNICAL FIELD

The present invention relates to a haloolefin-based composition.

BACKGROUND ART

Hydrofluorocarbons (HFCs), such as HFC-125 and HFC-32, have been widely used as important substitutes for CFCs, HCFCs, etc., which are known as substances that deplete the ozone layer. Known examples of such substitutes include "HFC-410A," which is a mixture of HFC-32 and HFC-125, "HFC-404A," which is a mixture of HFC-125, HFC-134a, and HFC-143a, etc.

Such substitutes have various applications, such as heat transfer media, refrigerants, foaming agents, solvents, cleaning agents, propellants, and fire extinguishers, and are consumed in large amounts. However, since these substances have a global warning potential (GWP) several thousand times higher than that of $CO_2$, many people are concerned that their diffusion may affect global warming. As a global warming countermeasure, the substances are collected after being used; however, not all of them can be collected, and their diffusion due to leakage, etc., cannot be disregarded. For use in refrigerants, heat transfer media, etc., although substitution with $CO_2$ or hydrocarbon-based substances has been studied, $CO_2$ refrigerants have many difficulties in reducing comprehensive greenhouse gas emissions, including energy consumption, because of the requirement of large equipment due to the low efficiency of the $CO_2$ refrigerants. Hydrocarbon-based substances also pose safety problems due to their high flammability.

Hydrofluoroolefins with a low warming potential are recently attracting attention as substances that can solve these problems. Hydrofluoroolefin is a generic name for unsaturated hydrocarbons containing hydrogen, fluorine, and chlorine, and includes substances represented by the following chemical formulae. The description in parentheses following each chemical formula indicates the refrigerant number typically used for refrigerant purposes.

$CF_3CF=CF_2$ (HFO-1216yc or hexafluoropropene),
$CF_3CF=CHF$ (HFO-1225ye),
$CF_3CF=CH_2$ (HFO-1234yf),
$CF_3CH=CHF$ (HFO-1234ze),
$CF_3CH=CH_2$ (HFO-1243zf)
$CF_3CCl=CH_2$ (HCFO-1233xf),
$CF_2ClCCl=CH_2$ (HCFO-1232xf),
$CF_3CH=CHCl$ (HCFO-1233zd),
$CF_3CCl=CHCl$ (HCFO-1223xd),
$CClF_2CCl=CHCl$ (HCFO-1222xd),
$CFCl_2CCl=CH_2$ (HCFO-1231xf), and
$CH_2ClCCl=CCl_2$ (HCO-1230xa).

Of these, fluoropropenes are particularly promising substances as candidates for refrigerants or heat transfer media with a low GWP; however, they may sometimes gradually decompose over time, etc., and thus are not highly stable. Accordingly, these substances have a problem of gradually reducing performance depending on the situation or environment when used in various applications.

To enhance the stability of fluoropropenes, a method for adding a phenol compound to a composition containing HFO-1234yf and $CF_3I$ is known (see, for example, Patent Literature 1).

CITATION LIST

Patent Literature

PTL 1: WO2005/103187

SUMMARY OF INVENTION

Technical Problem

The above method can improve the stability of HFO-1234yf by the effect of the phenol compound; however, it still has a problem of handling difficulty during mixing. The method for improving stability by adding a phenol compound as described above may also reduce the performance of fluoropropenes by the effect of the phenol compound, and has a problem in improving stability while maintaining performance.

The present invention was accomplished based on the above, and an object of the present invention is to provide a highly stable haloolefin-based composition that inhibits decomposition or oxidization.

Solution to Problem

As a result of extensive research to achieve the above object, the present inventors found that the above object can be attained by containing a very small amount of water in a mixture containing a haloolefin and other specific substances, and accomplished the invention. Specifically, the present invention relates to the following haloolefin-based compositions.

1. A haloolefin-based composition comprising
   (a) a haloolefin;
   (b) at least one compound selected from the group consisting of HFO-1234ze, HFC-254eb, HFO-1243zf, HFC-245eb, HFC-245fa, HFC-245cb, HFC-236ea, HFC-236fa, HFO-1225ye, 3,3,3-trifluoropropine, HFC-23, HFC-32, HFC-125, HFC-143a, HFC-134a, FC-1216, HCFO-1233xf, HCFO-1233zd, HCFO-1232xf, HCFO-1223xd, and chloromethane; and
   (c) water.
2. The composition according to Item 1, wherein the amount of the (c) water is 200 mass ppm or less based on the total amount of the (a) haloolefin.
3. The composition according to Item 1 or 2, which further comprises (d) oxygen.
4. The composition according to Item 3, wherein the amount of the (d) oxygen is 0.35 mol % or less based on the total amount of the (a) haloolefin.
5. The composition according to any one of Items 1 to 4, wherein the (a) haloolefin is tetrafluoropropene.
6. The composition according to Item 5, wherein the tetrafluoropropene is 2,3,3,3-tetrafluoropropene.
7. The composition according to Item 5, wherein the tetrafluoropropene is 1,3,3,3-tetrafluoropropene.
8. The composition according to any one of Items 1 to 7, which further comprises at least either, or both, of (e) polyalkyleneglycol and polyolether polyolester.
9. A haloolefin-based composition comprising
   (a) a haloolefin;
   (c) water; and
   (e) at least either, or both, of polyalkyleneglycol and polyolester.
10. The composition according to Item 9, wherein the amount of the (c) water is 200 mass ppm or less based on the total amount of the (a) haloolefin.

11. The composition according to Item 9 or 10, wherein the (a) haloolefin is tetrafluoropropene.
12. The composition according to Item 11, wherein the tetrafluoropropene is 2,3,3,3-tetrafluoropropene.
13. The composition according to Item 11, wherein the tetrafluoropropene is 1,3,3,3-tetrafluoropropene.

Advantageous Effects of Invention

According to the haloolefin-based composition of the present invention, the stability of haloolefin in the composition is improved because the composition contains water. Specifically, since the double bond in the molecule of the haloolefin can be stably present, and the haloolefin does not easily cause oxidization, the performance of the haloolefin is not likely to be lost for a long period of time.

DESCRIPTION OF EMBODIMENTS

Hereinafter, the embodiments of the present invention are explained in detail.

The haloolefin-based composition comprises (a) a haloolefin; (b) at least one compound selected from the group consisting of HFO-1234ze, HFC-254eb, HFO-1243zf, HFC-245eb, HFC-245fa, HFC-245cb, HFC-236ea, HFC-236fa, HFO-1225ye, 3,3,3-trifluoropropine, HFC-23, HFC-32, HFC-125, HFC-143a, HFC-134a, FC-1216, HCFO-1233xf, HCFO-1233zd, HCFO-1232xf, HCFO-1223xd, and chloromethane, which is produced as a byproduct in the production of haloolefin (hereinbelow, simply referred to as "(b) component"); and (c) water.

HFO-1234ze is 1,3,3,3-tetrafluoropropene, HFC-254eb is 1,1,1,2-tetrafluoropropane, HFO-1243zf is 3,3,3-trifluoropropene, HFC-245eb is 1,1,1,2,3-pentafluoropropane, HFC-245fa is 1,1,1,3,3-pentafluoropropane, HFC-245cb is 1,1,1,2,2-pentafluoropropane, HFC-236ea is 1,1,1,2,3,3-hexafluoropropane, HFC-236fa is 1,1,1,3,3,3-hexafluoropropane, HFO-1225ye is 1,2,3,3,3-pentafluoropropene, HFC-23 is trifluoromethane, HFC-32 is methylene difluoride, HFC-125 is 1,1,1,2,2-pentafluoroethane, HFC-143a is 1,1,1-trifluoroethane, HFC-134a is 1,1,1,2-tetrafluoroethane, FC-1216 is hexafluoropropene, HCFO-1233xf is 2-chloro-3,3,3-trifluoropropene, HCFO-1233zd is 1-chloro-3,3,3-trifluoropropene, HCFO-1232xf is 3,3-difluoropropene, and HCFO-1223xd is 1,2-dichloro-3,3,3-trifluoropropene.

The (b) component is a byproduct obtained in the production of the (a) haloolefin. Accordingly, the (b) component is different from the (a) haloolefin.

Because the haloolefin-based composition (hereinbelow, sometimes referred to as a "composition") contains water, the double bond in the molecule of the haloolefin can be stably present, and oxidization of the haloolefin does not easily occur. As a result, the stability of the haloolefin is improved.

The haloolefin is an unsaturated hydrocarbon having a halogen atom, such as fluoride or chlorine, as a substituent. In the haloolefin, all of the hydrogen may be substituted with halogen atoms, or part of the hydrogen may be substituted with halogen atoms. The number of carbon atoms in the haloolefin is not particularly limited, and it is, for example, 3 to 10. To increase the stability of the haloolefin in the composition, the number of carbon atoms in the haloolefin is preferably 3 to 8, and particularly preferably 3 to 6. The haloolefin contained in the composition may be a single compound or a mixture of different two or more compounds.

Particularly preferable examples of the haloolefin include tetrafluoropropene, pentafluoropropene, and trifluoropropene. The isomer types of these compounds are not particularly limited. Particularly preferable examples of the haloolefin include 2,3,3,3-tetrafluoropropene (HFO-1234yf), 1,3,3,3-tetrafluoropropene (HFO-1234ze), 1,2,3,3-tetrafluoropropene (HFO-1234ye), 1,1,2,3-tetrafluoropropene (HFO-1234yc), 1,2,3,3,3-pentafluoropropene (HFO-1225ye), 1,1,3,3,3-pentafluoropropene (HFO-1225zc), 3,3,3-trifluoropropene (HFO-1243zf), 1,1,1,4,4,4-hexafluoro-2-butene (HFO-1336mzz), 1,1,1,2,4,4,5,5,5-nonafluoropentene (HFO-1429myz), etc.

The haloolefin produced by a known method can be used. One such example includes a method for subjecting fluoroalkane to dehydrofluorination in the presence of a catalyst (a method described, for example, in JP2012-500182A). The number of carbon atoms of the fluoroalkane is not particularly limited, and it is preferably 3 to 8, and particularly preferably 3 to 6. For example, when the haloolefin is tetrafluoropropene, pentafluoropropane is used as a starting material, and subjected to dehydrofluorination reaction in the presence, of a catalyst to produce tetrafluoropropene. Specifically, when the haloolefin is 2,3,3,3-tetrafluoropropene (HFO-1234yf), 1,1,1,2,3-pentafluoropropane or 1,1,1,2,2-pentafluoropropane is used as a starting material, and subjected to dehydrofluorination reaction in the presence of a catalyst to produce 2,3,3,3-tetrafluoropropene (HFO-1234yf). When the haloolefin is 1,3,3,3-tetrafluoropropene (HFO-1234ze), 1,1,1,3,3-pentafluoropropane is used as a starting material, and subjected to dehydrofluorination reaction in the presence of a catalyst to produce 1,3,3,3-tetrafluoropropene (HFO-1234ze). In the above production method, chromium catalysts, such as chromium oxide or fluorinated chromium oxide, and other metal catalysts can be used as catalysts, and the reaction can be performed at a temperature in the range of 200 to 500° C.

When 2,3,3,3-tetrafluoropropene is produced according to the above production method, E- and Z-isomers of 1,3,3,3-tetrafluoropropene (HFO-1234ze), etc. are produced as byproducts. In this case, the byproducts were typically removed by purifying the resulting product to obtain the target 2,3,3,3-tetrafluoropropene. However, the E- and Z-isomers of 1,3,3,3-tetrafluoropropene produced according to the above method are byproducts and, at the same time, the (b) components in the composition. Accordingly, since the (b) component, which is an essential component in the composition of this embodiment, can also be obtained in the production of 2,3,3,3-tetrafluoropropene according to the above method, 2,3,3,3-tetrafluoropropene has an advantage in that it can be used in the state containing the byproduct without purification. Of course, in the production of haloolefins other than 2,3,3,3-tetrafluoropropene according to the above method as well, as long as the byproduct is a (b) component, the result can be used without purification as haloolefin in the composition. Accordingly, when the haloolefin is produced by the method in which fluoroalkane is subjected to dehydrofluorination in the presence of a catalyst, the byproduct may be contained in the haloolefin.

The (b) component in the composition is at least one compound selected from the group consisting of HFO-1234ze, HFC-254eb, HFO-1243zf, HFC-245eb, HFC-245fa, HFC-245cb, HFC-236ea, HFC-236fa, HFO-1225ye, 3,3,3-trifluoropropine, HFC-23, HFC-32, HFC-125, HFC-143a, HFC-134a, FC-1216, HCFO-1233xf, HCFO-1233zd, HCFO-1232xf, HCFO-1223xd, and chloromethane. These (b) components can be used singly or in a combination of two or more, and the combination is not particularly limited.

The (b) component that is produced by a known method can be used, and as described above, the component produced as a byproduct in the production of haloolefin can also be used.

Water is not particularly limited, and purified water, such as distilled water, ion exchange water, filtered water, tap water, and ultrapure water obtained by a commercially available device for generating pure water, etc., can be used. However, since water containing acid, such as HCl, may corrode equipment or reduce the haloolefin stabilizing effect, it is preferable to remove HCl, etc., to an undetectable level in a typical analysis method. The amount of acid is preferably 10 mass ppm or less, and more preferably 1 mass ppm or less based on the total amount of the (a) component, (b) component, and (c) component in the composition.

Although the pH of the water is not particularly limited, it is generally in the range of 6 to 8. When the amount of acid in the water is in the above range, the pH of the water is generally within the range of 6 to 8.

The amount of water in the composition is preferably 200 mass ppm or less based on the total amount of the (a) haloolefin. In this range, the haloolefin stabilizing effect is fully exhibited. The amount of water being 200 mass ppm or less, and more preferably less than 30 mass ppm based on the total amount of haloolefin can easily prevent device corrosion and the acceleration of haloolefin decomposition. The lower limit of the amount of water in the composition is not limited as long as the effect of the present invention is exhibited. For example, it is 0.1 mass ppm, and more preferably 3 mass ppm.

When the amount of water is in this range, the stability of haloolefin in the composition is further improved. The amount of water in the composition is particularly preferably over 3 mass ppm and less than 30 mass ppm. In this range, the stability of haloolefin in the composition is further improved. The amount of water in the composition being less than 30 mass ppm inhibits prevention of refrigerant performance.

The amount of the (b) component in the composition is preferably 0.1 mass ppm or more to less than 10,000 mass ppm based on the total amount of haloolefin. In this range, the haloolefin stabilizing effect may not be significantly inhibited.

The composition may contain other known additives as long as the effect of the present invention is not inhibited. The amount of other additives is preferably 50 mass % or less, and more preferably 40 mass % or less based on the total amount of the composition.

The composition can be prepared by any method. For example, each component is prepared and mixed in a predetermined composition ratio, thus obtaining a composition.

In the composition, because of the presence of water, the double bond of haloolefin is stably present, which is not likely to cause oxidization, attaining highly stable haloolefin. Accordingly, the composition can be stored for a long period of time as compared with typical haloolefins. Moreover, because of the highly stable haloolefin, the performance of haloolefin may not be significantly impaired. Accordingly, even when the composition is used as a refrigerant or a heat transfer medium, the performance of the composition as the refrigerant or heat transfer medium is excellent due to the high stability of the haloolefin.

The composition can further contain (d) oxygen. When the composition contains (d) oxygen, the amount of the (d) oxygen is preferably 0.35 mol % or less based on the total amount of the (a) haloolefin. When the amount of oxygen is in this range, the stability of haloolefin in the composition is further improved. From this point of view, a lower amount of oxygen in the composition is better. However, as described above, since the composition contains water, the stability of the haloolefin can be maintained by the effect of the water, as long as the amount of oxygen is in the above range. The lower limit of the amount of oxygen in the composition is, for example, 1 ppm, which is the detection limit of gas chromatography.

When the composition is used as a refrigerant or a heat transfer medium as described above, 2,3,3,3-tetrafluoropropene (HFO-1234yf), 1,3,3,3-tetrafluoropropene (HFO-1234ze), 1,2,3,3-tetrafluoropropene (HFO-1234ye), 1,2,3,3,3-pentafluoropropene (HFO-1225ye), 3,3,3-trifluoropropene (HFO-1243zf), etc., are particularly advantageous as haloolefins.

When the composition is used as a refrigerant or a heat transfer medium, at least either, or both, of (e) polyalkyleneglycol and polyolester can be contained as a lubricating oil in the composition. When the composition contains at least either, or both, of polyalkyleneglycol and polyolester, the (b) component may be or may not be contained in the composition. When the (b) component is not contained in the composition, the composition contains a (a) haloolefin, (c) water, and at least either, or both, of (e) polyalkyleneglycol and polyolester. The structures of (a) haloolefin and (c) water are the same as above.

The amount of the lubricating oil is 10 to 50 mass % based on the total amount of components (a), (b) and (c) in the composition; however, it is not particularly limited to this range because it differs depending on the specification of the freezer oil tank. When the amount of lubricating oil is in this range, the stability of haloolefin is not impaired. Moreover, the lubricating oil may further contain polyvinyl ether (PVE), or may be formed of polyvinyl ether alone.

Examples of polyalkyleneglycol (PAG) include "SUNICE P56," etc., produced by Japan Sun Oil Company Ltd. Examples of polyolester (POE) include "Ze-GLES RB32," etc., produced by JX Nippon Oil & Energy Corporation.

When the composition contains a lubricating oil, the composition can also contain (d) oxygen. When the composition contains (d) oxygen, the amount of (d) oxygen is preferably 0.35 mol % or less based on the total amount of the (a) haloolefin for the same reasons as above.

A refrigerant or heat transfer medium that mainly contains haloolefin is likely to cause decomposition or oxidization when it is in contact with metal, etc., and is likely to lose performance as a refrigerant or heat transfer medium. However, when the above composition is used as a refrigerant or heat transfer medium, a reduction in the performance of the refrigerant or heat transfer medium can be inhibited because of the high stability of the haloolefin.

Accordingly, the composition of the present invention can be used in various applications in addition to refrigerants and heat transfer media. When the composition is used for purposes other than refrigerants and heat transfer media, examples of the haloolefin include 2,3,3,3-tetrafluoropropene (HFO-1234yf), 1,3,3,3-tetrafluoropropene (HFO-1234ze), 1,2,3,3-tetrafluoropropene (HFO-1234ye), 1,1,2,3-tetrafluoropropene (HFO-1234yc), 1,2,3,3,3-pentafluoropropene (HFO-1225ye), 1,1,3,3,3-pentafluoropropene (HFO-1225zc), 3,3,3-trifluoropropene (HFO-1243zf), 1,1,1,4,4,4-hexafluoro-2-butene (HFO-1336mzz), 1,1,1,2,4,4,5,5,5-nonafluoropentene (HFO-1429myz), etc.

EXAMPLES

The present invention is explained in detail below with reference to the Examples, but the present invention is not limited to the embodiments of the Examples.

Example 1

2,3,3,3-Tetrafluoropropene (hereinbelow simply referred to as "HFO-1234yf") and water were prepared and mixed to produce three types of haloolefin-based compositions containing water in amounts of 10 mass ppm, 200 mass ppm, and 10,000 mass ppm relative to the HFO-1234yf. The HFO-1234yf was produced, for example, by the method described in Example 1 of JP2012-500182A, and JP2009-126803A. HF generated in the above production was deoxidized by using a water washing column and an alkali column containing an NaOH aqueous solution. The resulting haloolefin-based composition might contain a byproduct (for example, 1,3,3,3-tetrafluoropropene (HFO-1234ze), i.e., component (b)) generated in the production of HFO-1234yf.

Example 2

1,3,3,3-Tetrafluoropropene (hereinbelow simply referred to as "HFO-1234ze") and water were prepared and mixed to produce three types of haloolefin-based compositions containing water in amounts of 10 mass ppm, 200 mass ppm, and 10,000 mass ppm relative to the HFO-1234ze. The HFO-1234ze was obtained together with HFO-1234yf by the dehydrofluorination of HFC-245eb according to the method described in JP2012-500182. HF generated in the above production was deoxidized by using a water washing column and an alkali column containing an NaOH aqueous solution. HFO-1234yf was a (b) component.

Comparative Example 1

A haloolefin-based composition was obtained by the same method as in Example 1 except that water was not added.

Comparative Example 2

A haloolefin-based composition was obtained by the same method as in Example 2 except that water was not added.

Haloolefin Stability Test 1

The haloolefin-based compositions obtained in the Examples and Comparative Examples were subjected to a haloolefin stability test as described below. The haloolefin-based composition was added in a manner such that the amount of haloolefin was 0.01 mol to a glass tube (ID 8 mm ΦxOD 12 mm ΦxL 300 mm), a side of which was sealed. The tube was hermitically sealed. The tube was allowed to stand in a constant temperature bath in a 150° C. atmosphere, and was kept for one week in this state. Subsequently, the tube was removed from the constant temperature bath and cooled, and then acid in the gas inside the tube was analyzed to evaluate the stability of the haloolefin.

Haloolefin Stability Test 2

The haloolefin-based compositions obtained in the Examples and Comparative Examples were subjected to a haloolefin stability test as described below. The haloolefin-based composition was added in a manner such that the amount of haloolefin was 0.01 mol to a glass tube (ID 8 mm ΦxOD 12 mm ΦxL 300 mm), a side of which was sealed. Subsequently, oxygen was enclosed in the tube by adjusting the acid concentration to a predetermined mol concentration (0.010 mol %, 0.115 mol %, or 0.345 mol %) relative to the number of moles of haloolefin filled. The tube was allowed to stand in a constant temperature bath in a 150° C. atmosphere, and was kept for one week in this state. Subsequently, the tube was removed from the constant temperature bath and cooled, and then acid in the gas inside the tube was analyzed to evaluate the stability of the haloolefin.

Acid in the gas was analyzed according to the following method. Gas remaining in the tube after cooling was completely coagulated by using liquid nitrogen. Subsequently, the tube was opened and gradually defrosted to collect gas in a sampling bag. 5 g of pure water was poured into the sampling bag, and acid was extracted into the pure water while efficiently bringing the pure water into contact with the collected gas. The extract was detected by ion chromatography, and the amounts (mass ppm) of fluoride ions (F−) and trifluoroacetate ions (CF3COO−) were measured.

Table 1 shows the test results. In Table 1, "yf" and "ze (E)" respectively indicate "HFO-1234yf" and "HFO-1234ze". (E) in "ze (E)" indicates the E isomer of HFO-1234ze.

TABLE 1

| No. | Example/Comparative Example | Type of haloolefin | Amount of oxygen (mol %) | Amount of water (mass ppm) | Amount of Acid (mass ppm) F− | CF$_3$COO− |
|---|---|---|---|---|---|---|
| 1 | Comparative Example 1 | yf | 0 | 0 (N.D.) | <1 | <1 |
| 2 | Example 1 | | 0 | 10 | <1 | <1 |
| 3 | Example 1 | | 0 | 200 | <1 | <1 |
| 4 | Example 1 | | 0 | 10000 | <1 | <1 |
| 5 | Comparative Example 1 | | 0.010 | 0 (N.D.) | 70 | 550 |
| 6 | Example 1 | | 0.010 | 10 | 35 | 90 |
| 7 | Example 1 | | 0.010 | 200 | 10 | 25 |
| 8 | Example 1 | | 0.010 | 10000 | <1 | 10 |
| 9 | Comparative Example 1 | | 0.115 | 0 (N.D.) | 300 | 1850 |
| 10 | Example 1 | | 0.115 | 10 | 100 | 330 |
| 11 | Example 1 | | 0.115 | 200 | 30 | 100 |
| 12 | Example 1 | | 0.115 | 10000 | 3 | 20 |
| 13 | Comparative Example 1 | | 0.345 | 0 (N.D.) | 1005 | 5850 |
| 14 | Example 1 | | 0.345 | 10 | 330 | 1900 |
| 15 | Example 1 | | 0.345 | 200 | 110 | 675 |
| 16 | Example 1 | | 0.345 | 10000 | 50 | 275 |
| 17 | Comparative Example 2 | Ze (E) | 0 | 0 (N.D.) | <1 | <1 |
| 18 | Example 2 | | 0 | 10 | <1 | <1 |
| 19 | Example 2 | | 0 | 200 | <1 | <1 |
| 20 | Example 2 | | 0 | 10000 | <1 | <1 |
| 21 | Comparative Example 2 | | 0.010 | 0 (N.D.) | 80 | 610 |
| 22 | Example 2 | | 0.010 | 10 | 30 | 95 |
| 23 | Example 2 | | 0.010 | 200 | 15 | 40 |
| 24 | Example 2 | | 0.010 | 10000 | 3 | 20 |
| 25 | Comparative Example 2 | | 0.115 | 0 (N.D.) | 410 | 1900 |
| 26 | Example 2 | | 0.115 | 10 | 105 | 385 |
| 27 | Example 2 | | 0.115 | 200 | 50 | 120 |
| 28 | Example 2 | | 0.115 | 10000 | 10 | 45 |
| 29 | Comparative Example 2 | | 0.345 | 0 (N.D.) | 1100 | 6020 |
| 30 | Example 2 | | 0.345 | 10 | 335 | 1930 |
| 31 | Example 2 | | 0.345 | 200 | 130 | 700 |
| 32 | Example 2 | | 0.345 | 10000 | 55 | 290 |

The amount of oxygen in each of composition Nos. 5 to 8 in Table 1 was set to 0.010 mol %. Since composition No. 5 did not contain water, the amount of acid in composition No. 5 was larger than those of composition Nos. 6 to 8 containing water. This indicates that since the amount of acid in composition No. 5 was larger, the decomposition or oxidization of HFO-1234yf, which was a haloolefin, advanced as compared to composition Nos. 6 to 8. The results indicate that HFO-1234yf, which was a haloolefin, was stabilized in the compositions containing water. The amount of oxygen in each of composition Nos. 9 to 12 was 0.115 mol %, and the amount of oxygen in each of composition Nos. 13 to 16 was 0.345 mol %; however, the results of composition Nos. 13 to 16 showed a similar tendency to the results obtained when the amount of oxygen was 0.115 mol %. Further, when the haloolefin was HFO-1234ze (Nos. 21 to 24, 25 to 28, and 29 to 32), a similar tendency was observed. In composition Nos. 1 to 4 and 17 to 20, the amount of acid was below 1 mass ppm, and it was found that most of the haloolefin decomposition did not proceed. This was presumably because oxygen was not added to the system, causing no oxidization, etc. Accordingly, in the system containing substantially no oxygen, the haloolefin was always stable regardless of whether water was contained in the composition.

The above clearly indicates that water contained in the composition stabilizes haloolefin as in the present invention.

The invention claimed is:

1. A haloolefin-based composition comprising:
   (a) HFO-1234yf;
   (b) HFO-1234ze in an amount of 0.1 ppm by weight or more and 10,000 ppm by weight or less based on the total amount of the (a) HFO-1234yf;
   (c) water in an amount of 3 ppm by weight or more and 200 ppm by weight or less based on the total amount of the (a) HFO-1234yf; and
   (d) oxygen in an amount of more than 0 mol % and 0.35 mol % or less based on the total amount of the (a) HFO-1234yf.

2. The composition according to claim 1, which further comprises (e) at least one component selected from the group consisting of polyalkyleneglycol and polyolester.

3. A haloolefin-based composition comprising:
   (a) HFO-1234ze;
   (b) HFO-1234yf in an amount of 0.1 ppm by weight or more and 10,000 ppm by weight or less based on the total amount of the (a) HFO-1234ze;
   (c) water in an amount of 3 ppm by weight or more and 200 ppm by weight or less based on the total amount of the (a) HFO-1234ze; and
   (d) oxygen in an amount of more than 0 mol % and 0.35 mol % or less based on the total amount of the (a) HFO-1234ze.

4. The composition according to claim 3, which further comprises (e) at least one component selected from the group consisting of polyalkyleneglycol and polyolester.

* * * * *